United States Patent
Cierny et al.

(10) Patent No.: US 11,083,012 B2
(45) Date of Patent: Aug. 3, 2021

(54) MULTI-CHANNEL LISTEN-BEFORE-TALK ARRANGEMENTS FOR LICENSED-ASSISTED ACCESS IN LTE

(71) Applicant: NOKIA SOLUTIONS AND NETWORKS OY, Espoo (FI)

(72) Inventors: Michal Cierny, Helsinki (FI); Klaus Hugl, Vienna (AT); Timo Erkki Lunttila, Espoo (FI); Cassio Barboza Ribeiro, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/746,069

(22) PCT Filed: Aug. 17, 2015

(86) PCT No.: PCT/EP2015/068854
§ 371 (c)(1),
(2) Date: Jan. 19, 2018

(87) PCT Pub. No.: WO2017/028899
PCT Pub. Date: Feb. 23, 2017

(65) Prior Publication Data
US 2018/0213562 A1  Jul. 26, 2018

(51) Int. Cl.
*H04W 74/08* (2009.01)
*H04W 72/04* (2009.01)
(Continued)

(52) U.S. Cl.
CPC ... *H04W 74/0808* (2013.01); *H04W 72/0453* (2013.01); *H04W 16/14* (2013.01); *H04W 84/12* (2013.01)

(58) Field of Classification Search
CPC ......... H04W 74/0808; H04W 72/0453; H04W 84/12; H04W 16/14
See application file for complete search history.

(56) References Cited

U.S. PATENT DOCUMENTS

| 2012/0314673 | A1  | 12/2012 | Noh et al. |
| 2014/0307729 | A1* | 10/2014 | Son ............... H04J 11/0056 370/350 |

(Continued)

FOREIGN PATENT DOCUMENTS

| CN | 103561399 A | 2/2014 |
| CN | 103580840 A | 2/2014 |
| CN | 104486013 A | 4/2015 |

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," IEEE Standard, IEEE, Dec. 18, 2013, pp. 1-425, XP068055837.
(Continued)

*Primary Examiner* — Gregory B Sefcheck
*Assistant Examiner* — Joshua Smith
(74) *Attorney, Agent, or Firm* — Squire Patton Boggs (US) LLP

(57) ABSTRACT

There is provided a method comprising determining, at a first access point, whether a carrier from a plurality of carriers is a primary listen-before-talk carrier or a secondary listen-before-talk carrier and providing information using the carrier, said information comprising an indication of whether the respective carrier is a primary listen-before-talk carrier or a secondary listen-before-talk carrier.

18 Claims, 7 Drawing Sheets

(51) Int. Cl.
*H04W 84/12* (2009.01)
*H04W 16/14* (2009.01)

(56) References Cited

U.S. PATENT DOCUMENTS

| | | | | |
|---|---|---|---|---|
| 2015/0029886 A1* | 1/2015 | Seo | ............... | H04J 11/005 370/252 |
| 2015/0078298 A1* | 3/2015 | Barriac | ............... | H04W 40/02 370/329 |
| 2015/0195855 A1* | 7/2015 | Liu | ............... | H04W 24/02 370/336 |
| 2015/0289142 A1* | 10/2015 | Abeysekera | ...... | H04W 72/0453 370/338 |
| 2015/0351105 A1* | 12/2015 | Lee | ............... | H04W 24/02 370/241.1 |
| 2015/0372779 A1* | 12/2015 | Lim | ............... | H04W 56/003 370/338 |
| 2015/0373741 A1* | 12/2015 | Yerramalli | ........ | H04W 74/0808 370/336 |
| 2015/0382374 A1* | 12/2015 | Bhorkar | ............... | H04W 24/00 370/330 |
| 2016/0007368 A1* | 1/2016 | Moon | ............... | H04W 56/00 370/329 |
| 2016/0066255 A1* | 3/2016 | Marinier | ............ | H04W 56/001 370/350 |
| 2016/0100404 A1* | 4/2016 | Han | ............... | H04L 5/00 370/329 |
| 2016/0119936 A1* | 4/2016 | Kim | ............... | H04W 72/005 370/329 |
| 2016/0227416 A1* | 8/2016 | Suzuki | ............ | H04W 72/0453 |
| 2016/0338086 A1* | 11/2016 | Zhou | ............... | H04W 72/1252 |
| 2016/0381565 A1* | 12/2016 | Oteri | ............... | H04W 16/14 370/328 |
| 2017/0006613 A1* | 1/2017 | Kakishima | ............ | H04W 24/08 |
| 2017/0339696 A1* | 11/2017 | Xu | ............... | H04W 48/16 |
| 2018/0176956 A1* | 6/2018 | Koutsimanis | ......... | H04W 74/04 |

OTHER PUBLICATIONS

International Search Report & Written Opinion dated Apr. 19, 2016 corresponding to International Patent Application No. PCT/EP2015/068854.
Ericsson: "Discussion on Wi-Fi and DL-only LAA Coexistence for Multi-Channel Transmission," 3GPP Draft; R1-154624, 3rd Generation Partnership Project; 3GPP TSG RAN WG1 #82, Beijing, China, Aug. 24-28, 2015, Aug. 15, 2015, XP050993829.
European Office Action corresponding to EP Appln. No. 15 753 352.2, dated Feb. 7, 2020.
Alcatel-Lucent et al., "Channel Selection for Licensed-Assisted Access", 3GPP TSG RAN WG1 Meeting #79, San Francisco, USA, Nov. 17-21, 2014, R1-144702, 4 pages.
European Office Action corresponding to EP Application No. 15 753 352.2, dated Aug. 4, 2020.
European Communication pursuant to Article 94(3) EPC, corresponding to EP Application No. 15 753352.2, dated Feb. 8, 2021.
Chinese Office Action corresponding to CN Application No. 201580082125.6, dated Feb. 5, 2021.
Alcatel-Lucent Shanghai Bell, "Channel Selection for LAA", 3GPP TSG RAN WG1 Meeting #80, Athens, Greece, Feb. 9-13, 2015, R1-150194, 4 pages.

* cited by examiner

MULTI-CHANNEL LISTEN-BEFORE-TALK ARRANGEMENTS FOR LICENSED-ASSISTED ACCESS IN LTE

FIELD

The present application relates to a method, apparatus and system and in particular but not exclusively, to multi-channel Listen-Before-Talk (LBT) arrangements for LTE operation on unlicensed spectrum, aka licensed-assisted access (LAA).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3$^{rd}$ Generation Partnership Project (3GPP). The various development stages of the 3GPP LTE specifications are referred to as releases.

SUMMARY OF THE INVENTION

In a first aspect, there is provided a method comprising determining, at a first access point, whether a carrier from a plurality of carriers is a primary listen-before-talk carrier or a secondary listen-before-talk carrier and providing information using the carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and the presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The method may comprise encoding the information into signalling including cyclic redundancy check.

The method may comprise determining whether the respective carrier is used by at least one second access point as a primary listen-before-talk carrier or a secondary listen-before-talk carrier.

The method may comprise receiving information from a user equipment and determining whether the respective carrier is used as a primary listen-before-talk carrier or a secondary listen-before-talk carrier by the at least one second access point in dependence on the information received from the user equipment.

The method may comprise receiving information from the second access point and determining whether the respective carrier is used as a primary listen-before-talk carrier or a secondary listen-before-talk carrier by the at least one second access point in dependence on the information received from the second access point.

The plurality of carriers may comprise a plurality of licensed assisted access carriers.

In a second aspect there is provided a method comprising receiving, at a user equipment, information from a first access point using a first carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The method may comprise providing information to a second access point, said information comprising an indication of whether the first access point uses the respective carrier as a primary listen-before-talk carrier or a secondary listen-before-talk carrier.

The respective carrier may comprise a licensed assisted access carrier.

In a third aspect there is provided a method comprising receiving information from a first access point using a first carrier at a second access point, said information comprising an indication of whether the respective carrier is a primary listen-before-talk carrier or a secondary listen-before-talk carrier.

The method may comprise providing information to the first access point, said information comprising an indication of whether the second access point uses the respective carrier as a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The respective carrier may comprise a licensed assisted access carrier.

In a fourth aspect there is provided an apparatus comprising means for determining, at a first access point, whether a carrier from a plurality of carriers is a primary listen-before-talk carrier or a secondary listen-before-talk carrier and means for providing information using the carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and the presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The apparatus may comprise means for encoding the information into signalling including cyclic redundancy check.

The apparatus may comprise means for determining whether the respective carrier is used by at least one second access point as a primary listen-before-talk carrier or a secondary listen-before-talk carrier.

The apparatus may comprise means for receiving information from a user equipment and means for determining whether the respective carrier is used as a primary listen-before-talk carrier or a secondary listen-before-talk carrier by the at least one second access point in dependence on the information received from the user equipment.

The apparatus may comprise means for receiving information from the second access point and means for determining whether the respective carrier is used as a primary listen-before-talk carrier or a secondary listen-before-talk carrier by the at least one second access point in dependence on the information received from the second access point.

The plurality of carriers may comprise a plurality of licensed assisted access carriers.

In a fifth aspect there is provided an apparatus comprising means for receiving, at a user equipment, information from a first access point using a first carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The apparatus may comprise means for providing information to a second access point, said information comprising an indication of whether the first access point uses the respective carrier as a primary listen-before-talk carrier or a secondary listen-before-talk carrier.

The respective carrier may comprise a licensed assisted access carrier.

In a sixth aspect there is provided an apparatus comprising means for receiving information from a first access point using a first carrier at a second access point, said information comprising an indication of whether the respective carrier is a primary listen-before-talk carrier or a secondary listen-before-talk carrier.

The apparatus may comprise means for providing information to the first access point, said information comprising an indication of whether the second access point uses the respective carrier as a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The respective carrier may comprise a licensed assisted access carrier.

In a seventh aspect there is provided an apparatus, said apparatus comprising at least one processor and at least one memory including a computer program code, the at least one memory and the computer program code configured to, with the at least one processor, cause the apparatus at least to determine, at a first access point, whether a carrier from a plurality of carriers is a primary listen-before-talk carrier or a secondary listen-before-talk carrier and provide information using the carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and the presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The apparatus may be configured to encode the information into signalling including cyclic redundancy check.

The apparatus may be configured to determine whether the respective carrier is used by at least one second access point as a primary listen-before-talk carrier or a secondary listen-before-talk carrier.

The apparatus may be configured to receive information from a user equipment and determine whether the respective carrier is used as a primary listen-before-talk carrier or a secondary listen-before-talk carrier by the at least one second access point in dependence on the information received from the user equipment.

The apparatus may be configured to receive information from the second access point and determine whether the respective carrier is used as a primary listen-before-talk carrier or a secondary listen-before-talk carrier by the at least one second access point in dependence on the information received from the second access point.

The plurality of carriers may comprise a plurality of licensed assisted access carriers.

In an eighth aspect there is provided an apparatus, said apparatus comprising at least one processor and at least one memory including a computer program code, the at least one memory and the computer program code configured to, with the at least one processor, cause the apparatus at least to receive, at a user equipment, information from a first access point using a first carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The apparatus may be configured to provide information to a second access point, said information comprising an indication of whether the first access point uses the respective carrier as a primary listen-before-talk carrier or a secondary listen-before-talk carrier.

The respective carrier may comprise a licensed assisted access carrier.

In a ninth aspect there is provided an apparatus at least one processor and at least one memory including a computer program code, the at least one memory and the computer program code configured to, with the at least one processor, cause the apparatus at least to receive information from a first access point using a first carrier at a second access point, said information comprising an indication of whether the respective carrier is a primary listen-before-talk carrier or a secondary listen-before-talk carrier.

The apparatus may be configured to provide information to the first access point, said information comprising an indication of whether the second access point uses the respective carrier as a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The respective carrier may comprise a licensed assisted access carrier.

In a tenth aspect there is provided a computer program embodied on a non-transitory computer-readable storage medium, the computer program comprising program code for controlling a process to execute a process, the process comprising determining, at a first access point, whether a carrier from a plurality of carriers is a primary listen-before-talk carrier or a secondary listen-before-talk carrier and providing information using the carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and the presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The process may comprise encoding the information into signalling including cyclic redundancy check.

The process may comprise determining whether the respective carrier is used by at least one second access point as a primary listen-before-talk carrier or a secondary listen-before-talk carrier.

The process may comprise receiving information from a user equipment and determining whether the respective carrier is used as a primary listen-before-talk carrier or a secondary listen-before-talk carrier by the at least one second access point in dependence on the information received from the user equipment.

The process may comprise receiving information from the second access point and determining whether the respective carrier is used as a primary listen-before-talk carrier or a secondary listen-before-talk carrier by the at least one second access point in dependence on the information received from the second access point.

The plurality of carriers may comprise a plurality of licensed assisted access carriers.

In an eleventh aspect there is provided a computer program embodied on a non-transitory computer-readable storage medium, the computer program comprising program code for controlling a process to execute a process, the process comprising receiving, at a user equipment, information from a first access point using a first carrier, said information comprising an indication of whether the respective carrier is a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The process may comprise providing information to a second access point, said information comprising an indication of whether the first access point uses the respective carrier as a primary listen-before-talk carrier or a secondary listen-before-talk carrier.

The respective carrier may comprise a licensed assisted access carrier.

In an twelfth aspect there is provided a computer program embodied on a non-transitory computer-readable storage medium, the computer program comprising program code for controlling a process to execute a process, the process comprising receiving information from a first access point using a first carrier at a second access point, said information comprising an indication of whether the respective carrier is a primary listen-before-talk carrier or a secondary listen-before-talk carrier.

The process may comprise providing information to the first access point, said information comprising an indication of whether the second access point uses the respective carrier as a primary listen-before-talk carrier or a secondary listen-before-talk carrier.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

The information comprising an indication of whether the respective carrier is a primary listen-before-talk carrier or a secondary listen-before-talk carrier may comprise at least one of time position and frequency position of reference signals within a discovery reference signal, reference signal sequence configuration within a discovery reference signal and presence or absence of a signal sequence within a discovery reference signal.

The information comprising an indication of whether the respective carrier is a primary listen-before-talk carrier or a secondary listen-before-talk carrier may comprise the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

The information comprising an indication of whether the respective carrier is a primary listen-before-talk carrier or a secondary listen-before-talk carrier may comprise an explicit indication.

The information may be encoded into signalling including cyclic redundancy check.

The respective carrier may comprise a licensed assisted access carrier.

In a thirteenth aspect there is provided a computer program product for a computer, comprising software code portions for performing the steps the method of the first, second and/or third aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
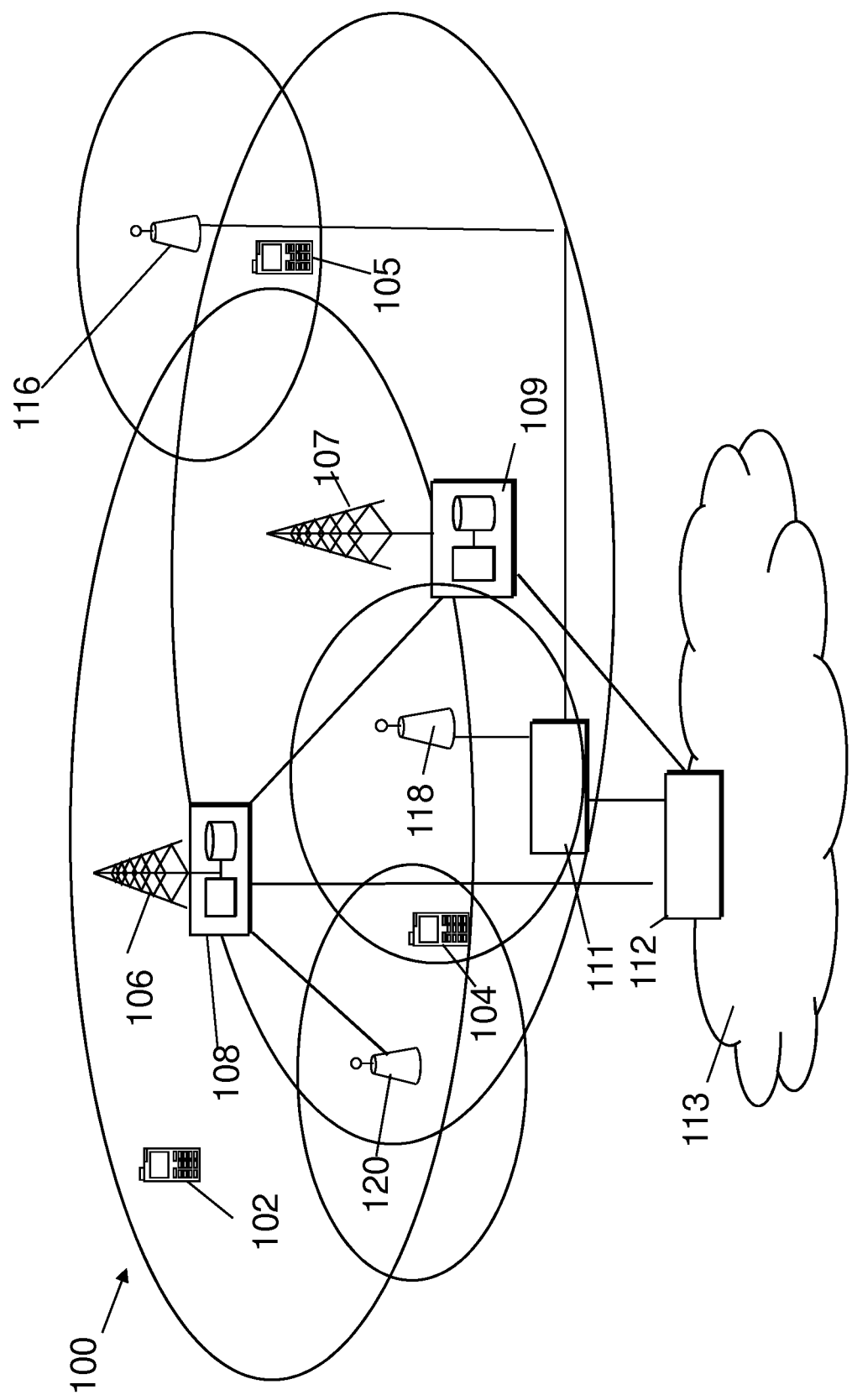
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 7.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
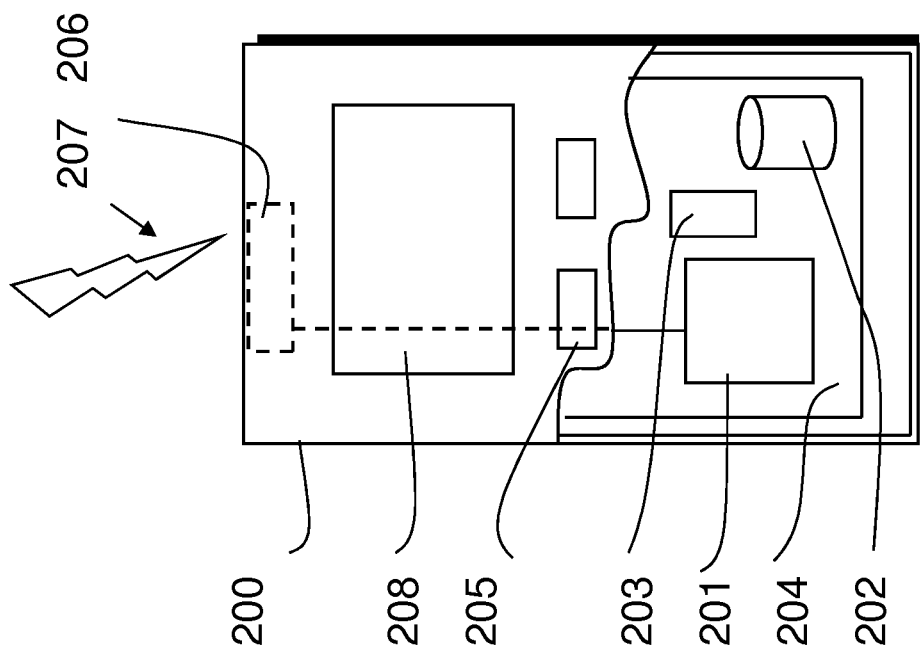
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided.

Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Wireless communication systems may be licensed to operate in particular spectrum bands. A technology, for example LTE, may operate, in addition to a licensed band, in an unlicensed band. Operating in an unlicensed band may be referred to as Licensed-Assisted Access (LAA). LTE-LAA may imply that a connection to a licensed band is maintained while using the unlicensed band. Moreover, the licensed and unlicensed bands may be operated together using, e.g., carrier aggregation or dual connectivity. For example, carrier aggregation between primary cell (PCell) on a licensed band and one or more secondary cells (SCells) on unlicensed band may be applied. In LTE LAA, stand-alone operation using unlicensed carrier only may be precluded.

The following is described with reference to an LTE-A communication system and, in particular, Listen-Before-Talk related arrangements for LTE operation on unlicensed spectrum LAA.

Licensed-Assisted Access using LTE is being considered for 3GPP Release 13. One objective of LAA discussions is to enhance LTE to enable licensed-assisted access to unlicensed spectrum while coexisting with other technologies and fulfilling regulatory requirements. In some jurisdictions, unlicensed technologies may need to abide by certain regulations, e.g. Listen-Before-Talk (LBT), in order to provide fair coexistence between LTE and other technologies such as Wi-Fi as well as between LTE operators.

In LTE-LAA, before being permitted to transmit, a user or an access point (such as eNodeB) may, depending on regulatory requirements, need to monitor a given radio frequency, i.e. carrier, for a short period of time to ensure the spectrum is not already occupied by some other transmission. This requirement is referred to as Listen-Before-Talk (LBT). The requirements for LBT vary depending on the geographic region: e.g. in the US such requirements do not exist, whereas in e.g. Europe and Japan the network elements operating on unlicensed bands need to comply with LBT requirements. Moreover, LBT may be needed in order to guarantee co-existence with other unlicensed band usage in order to enable e.g. fair co-existence with Wi-Fi also operating on the same spectrum and/or carriers.

Unnecessary transmissions on unlicensed carriers, or channels, should be kept at a minimum level to avoid interfering other devices or access points operating on the same carrier frequency or preventing such devices from accessing the channel due to LBT requirements/operation. LBT requirements may mean that access points and UEs operating on an unlicensed carrier may need to stop transmission from time to time in order to give other nodes the chance to start their transmission as well (i.e. in order to provide fair co-existence) and in order to monitor whether the channel is still available. If a channel is still sensed as free according to LBT rules, the eNodeB or UE may resume transmission. If the channel is sensed as occupied (i.e. another node is transmitting on that channel), the eNodeB or UE will need to continue to suspend transmission until the channel is sensed as unoccupied according to LBT rules.

Figure 3:
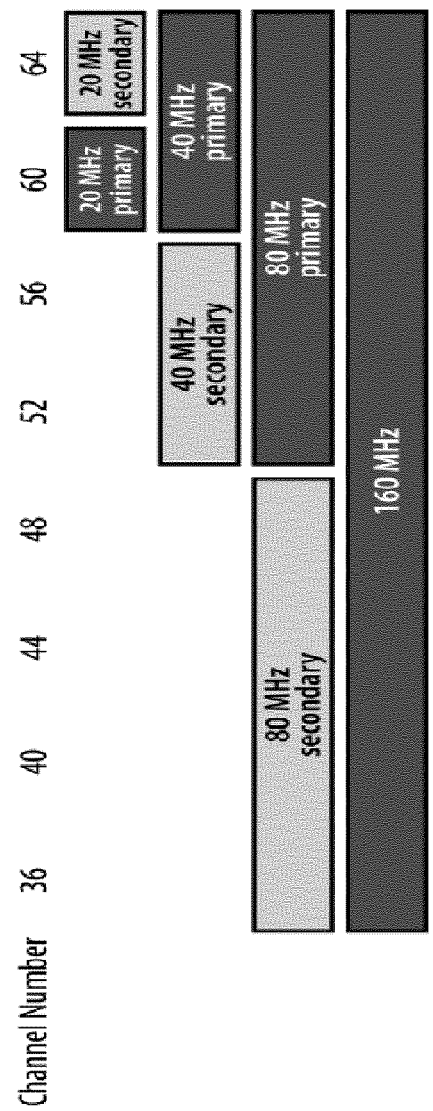
FIG. 3 shows a schematic diagram of the division of 802.11ac Wi-Fi channels into primary and secondary channels.

LBT operation with multiple LAA carriers is now under consideration. FIG. 3 shows an example of the division of 802.11ac WI-FI channels into primary and secondary channels. Wi-Fi devices based on 802.11ac standard can, under Very High Throughput category, operate on multiple 20 MHz channels (40 MHz, 80 MHz and 160 MHz is allowed). For each of these options, half of the band is called primary channel and the other half secondary channel.

During operation as shown in FIG. 3, transmission on the secondary channel only occurs if transmission also occurs on the primary channel.

The Wi-Fi LBT mechanism (CSMA/CA (carrier sense multiple access with collision avoidance) with exponential backoff) happens only on the primary 20 MHz channel; on the secondary channels, only short Energy Detect (4 μs) and Signal Detect (25 μs) Clear Channel Assessment (CCA) are performed after the primary channel was declared to be idle.

For example, if a node wanted to perform 80 MHz transmission, it performs a full Wi-Fi LBT legacy mechanism (CSMA/CA with exponential backoff) procedure on the 20 MHz primary channel (channel 60 in FIG. 3):

When the primary channel is considered to be idle according to the given procedure, the node performs only CCA on the 20 MHz secondary channel (channel 64). If the secondary 20 MHz channel is busy, the node can transmit only on the 20 MHz primary channel (channel 60). If also the channel 64 is idle, the node also performs in a next step CCA on the 40 MHz secondary channel (channels 52-56). If the channels 52-56 are busy, the node can transmit on up to 40 MHz (on channels 60 & 64). If all channel assessments were idle (step 1 full CSMA/CA on channel 60, step 2 CCA on channel 64, step 3 CCA on channels 52 & 56), the node can transmit on 80 MHz using channels 52-64.

When multiple 802.11ac devices operate in the same channel range, the IEEE specification (section 10.39.2 in 802.11ac-2013) says that device A should not operate its primary channel in the same channel where device B (any other Wi-Fi device) operates its secondary channel. In other words, the primary channels should be shared.

Because of the LBT requirement, LAA eNBs cannot transmit reference signals continuously on the LAA carriers. Modified LTE Rel-12 discovery reference signals (DRS) may be used at least for cell detection and radio resource management (RRM) measurements on given carriers. LAA DRS may contain at least primary synchronization signal (PSS)/secondary synchronization signal (SSS) for cell detection and some reference signal for RRM measurement, such as common reference signals (CRS) and/or channel state information reference signals (CSI-RS). Compared to Rel-12 DRS, LAA DRS may have to be time contiguous in order to operate with LBT.

The following relates to LAA design that may be beneficial in a case where LAA uses similar multi-channel LBT as Wi-Fi, as described with reference to FIG. 3. If LAA multi-channel LBT operates similarly to that of Wi-Fi's, for LAA eNB it would be beneficial to know whether a specific LAA carrier is a primary LBT carrier or a secondary LBT carrier. This may be needed for channel selection, irrespective of whether LAA nodes aim to share the primary LBT carriers (as described above with reference to Wi-Fi) or separate primary carriers. Although this information may be available within a single operator's network, it is not straightforward to supply in the case of multiple LAA operators sharing the same band. In Wi-Fi, the primary channel is identified by the presence of a beacon, i.e. broadcast information. In LAA carriers, equivalent beacons are not present. Modified Rel-12 Discovery Reference Signals (DRS) may be present, but on every LAA carrier in order to facilitate cell detection and RRM measurements. Therefore, the presence of DRS alone cannot be used to deduce if a carrier is a primary LBT carrier or not, if no additional broadcast information is available on LAA carriers.

A UE may search for the information in the other operator's licensed carrier Master Information Block (MIB) or one of System Information Blocks (SIB). MIB or SIB could encode which LAA carriers a given operator uses as primary LBT carriers. However, MIB is used for absolutely crucial information and it may not be desirable to increase its size. With SIB that problem is less pronounced, but currently UEs of one operator cannot decode SIBs of other operator. The encoded information would need to be valid for all unlicensed cells in the coverage of corresponding licensed carrier, as the coverage of the licensed carrier may be considerably larger than coverage of the LAA carrier. Therefore, another method of providing information about the primary carrier may be desirable.

Figure 4:
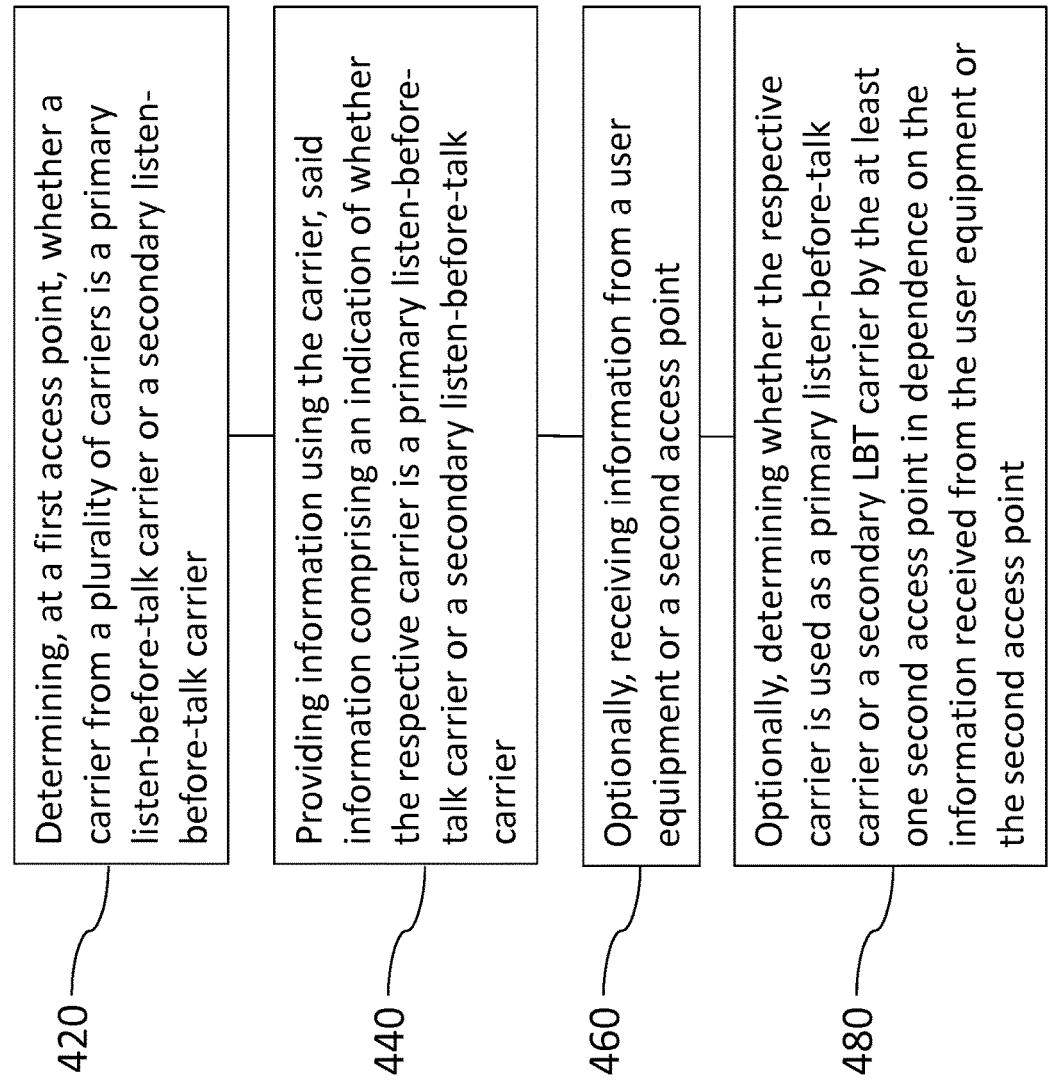
FIG. 4 shows a flowchart of an example method for providing LAA primary/secondary LBT carrier information.

FIG. 4 shows a flowchart of an example method suitable for indicating to a UE or an eNB whether a carrier in a multi-carrier system is a primary LBT carrier or a secondary LBT carrier.

In step 420, the method comprises determining, at a first access point, whether a carrier from a plurality of carriers is a primary listen-before-talk carrier or a secondary listen-before-talk carrier.

In step 440, the method comprises providing information using the carrier, said information comprising an indication of whether the respective carrier is a primary listen-before-talk carrier or a secondary listen-before-talk carrier.

The information may be provided to a UE or a second access point

Figure 5:
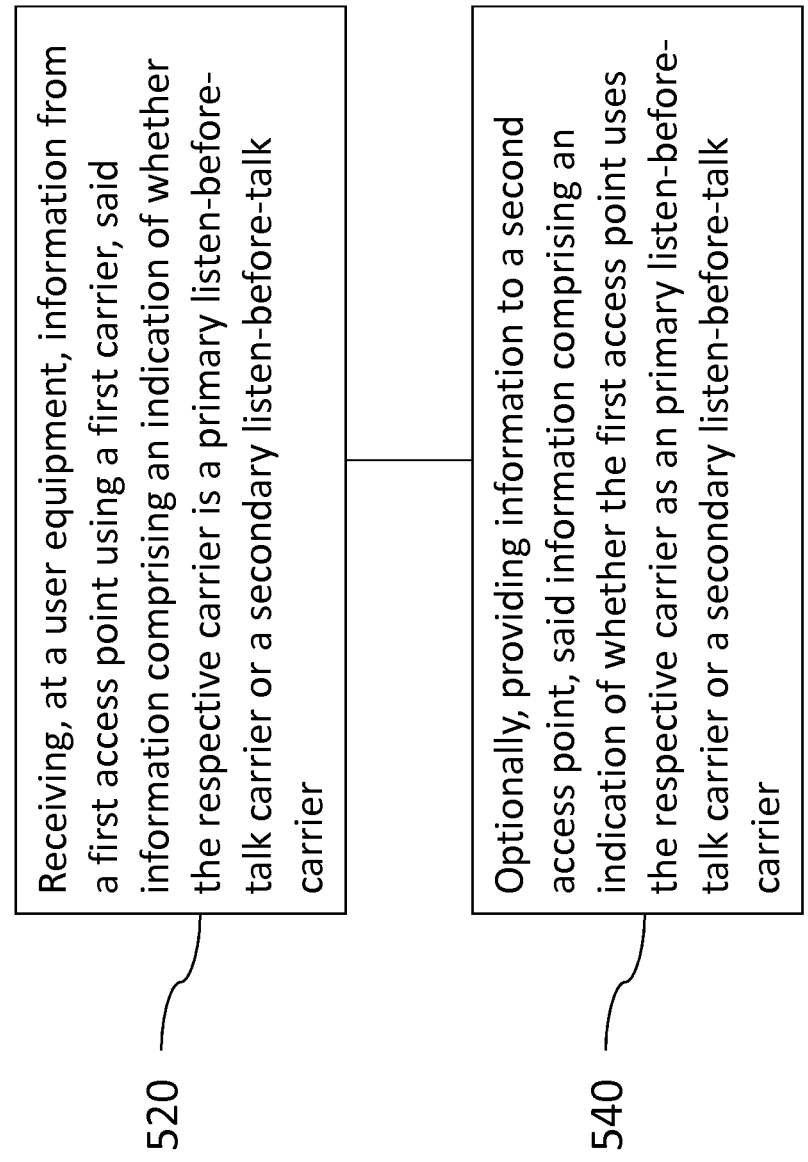
FIG. 5 shows a flowchart of an example method for providing LAA primary/secondary LBT carrier information.

FIG. 5 shows a flowchart of an example method suitable for indicating whether a carrier in a multi-carrier system is a primary LBT carrier or a secondary LBT carrier. The method comprises receiving 520, at a a user equipment, information from a first access point using a first carrier, said information comprising an indication of whether the respective carrier is a primary listen-before-talk carrier or a secondary listen-before-talk carrier.

Figure 6:
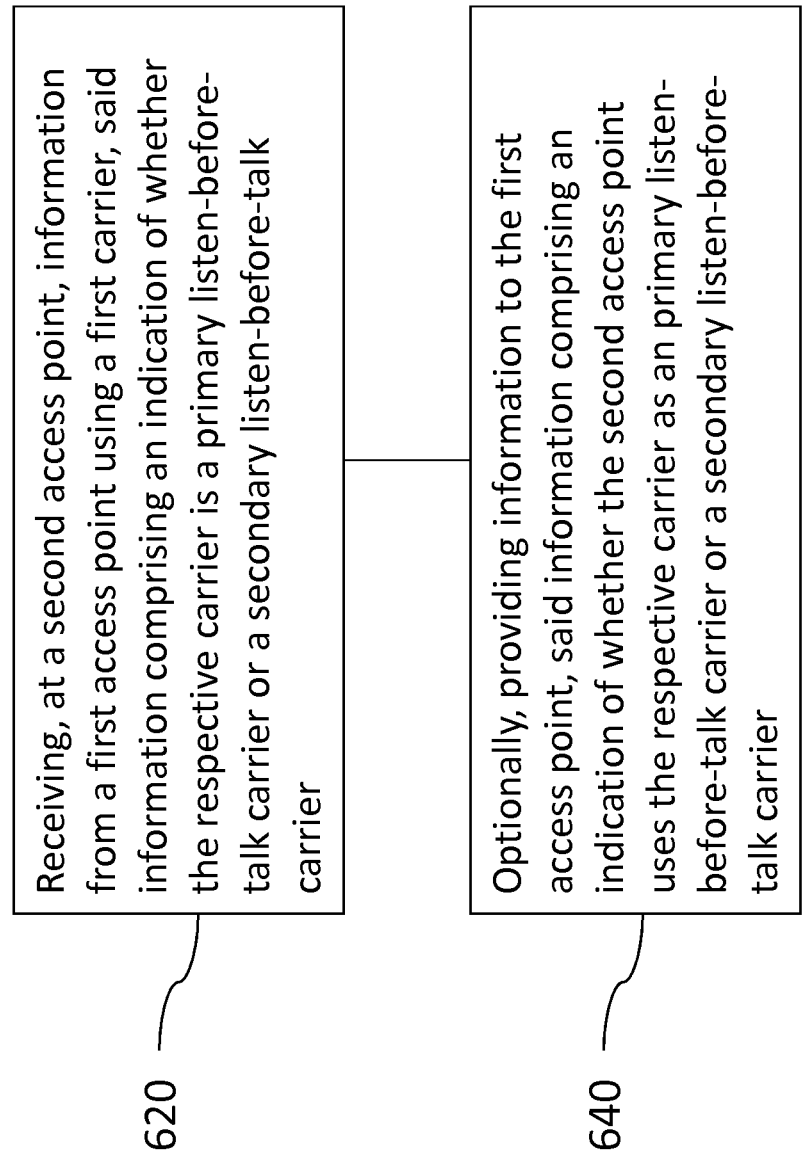
FIG. 6 shows a flowchart of an example method for providing LAA primary/secondary LBT carrier information.

FIG. 6 shows a flowchart of an example method suitable for indicating whether a carrier in a multi-carrier system is a primary LBT carrier or a secondary LBT carrier. The method comprises receiving 620, at a second access point, information from a first access point using a first carrier, said information comprising an indication of whether the respective carrier is a primary listen-before-talk carrier or a secondary listen-before-talk carrier.

The first and second access point may be a first and second eNB. The carriers may be LAA carriers.

The information comprising an indication of whether the respective carrier is a primary LBT carrier or a secondary LBT carrier may be encoded implicitly or explicitly into DRS and/or other broadcast transmission on the respective carrier. This may enable cross-operator information exchange on LAA carriers.

In one embodiment, the indication of LAA primary/secondary LBT carrier may be implicitly encoded into DRS. The DRS may contain at least PSS/SSS type of signals for cell detection and CRS type of signals for RRM measurements.

There may be several options for encoding the information into DRS.

The information comprising an indication of whether the respective carrier is a primary listen-before-talk carrier or a secondary listen-before-talk carrier may comprise physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

For example, in an embodiment, the Physical Cell ID (PCID) on the primary LBT carrier may belong to one PSS group (i.e. PCIDs given by one possible PSS value), and the secondary LBT carriers may use the two remaining PSS groups (i.e. PCIDs associated with the two remaining PSS values). The PCID is implicitly encoded into PSS/SSS and influences also for example the frequency domain position of the CRS resource elements. This specific design may allow primary LBT carriers to use 168 out of the 504 available PCID values (i.e. based on a single PSS group), and there would be no change needed to the design of DRS itself. Other grouping of PCIDs to a first plurality and second plurality based on the PSS group are possible as well.

The information comprising an indication of whether the respective carrier is a primary listen-before-talk carrier or a secondary listen-before-talk carrier comprises at least one of time position and frequency position of reference signals within a discovery reference signal, reference signal sequence configuration within a discovery reference signal and the presence or absence of a signal sequence within a discovery reference signal.

In an embodiment, the information may be encoded into the position of reference signals within DRS or into the design of sequence that is used for the reference signals.

Another option may be to attach additional signal sequence to DRS in case of primary (or secondary) LBT channel. Presence of the sequence thus indicates that given LAA channel is a primary (or secondary) LBT channel. This option may not affect UE complexity if it is an LAA eNB that searches for the additional sequence.

The information comprising an indication of whether the respective carrier is a primary listen-before-talk carrier or a secondary listen-before-talk carrier comprises the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

In an embodiment, the information may be encoded into relative position of DRS in the Discovery signals Measurement Timing Configuration (DMTC) period. For example, DRS on the primary LBT carrier would be allowed to be placed only in a subset of all available positions within DMTC, and secondary LBT carriers would use the other positions. This option may only work when operators have synchronized DMTC periods. It would however not require any changes to design of DRS itself.

The information comprising an indication of whether the respective carrier is a primary listen-before-talk carrier or a secondary listen-before-talk carrier may comprise an explicit indication. For example, the information may be encoded into DRS or another transmission on the respective carrier. The information may be encoded into signalling including the cyclic redundancy check (CRC).

In an embodiment, the indication of LAA primary/secondary LBT carrier may be explicitly encoded into DRS or other broadcast signal in given LAA carrier. This may corresponds to real signalling, i.e. information bit(s) appended with CRC and encoded into modulation symbols.

The method may comprise determining whether the respective carrier is used by at least one second access point as a primary listen-before-talk carrier or a secondary listen-before-talk carrier.

The method may comprise receiving information from a user equipment or a second access point (shown at optional step 460 of the flowchart of FIG. 4). Determining whether the respective carrier is used as a primary LBT carrier or a secondary LBT carrier by the at least one second access point may be carried out in dependence on information received from a user equipment or a second access point (as shown at optional step 480 in the flowchart of FIG. 4).

The information received from the user equipment may comprise RRM reports or other signalling from the UE. Alternatively or in addition, the determining may be based on channel measurements by the LAA eNB.

As shown at optional step 540 of the flowchart of FIG. 5, a UE may provide information to a second, neighbour, access point, said information comprising an indication of whether a first access point uses the respective carrier as a primary LBT carrier or a secondary LBT carrier.

The UE may provide information comprising an indication of whether an access point uses a respective carrier as a primary LBT carrier or a secondary LBT carrier to a neighbour access point using a modified or unmodified RRM measurement report, or another suitable type of report.

DRS and DL broadcast channels are by default received and processed at the UEs. Depending on the selected option, the UE may or may not have to report the information of LAA primary/secondary LBT carrier to the LAA eNB.

Determining whether the respective carrier is used as a primary LBT carrier or a secondary LBT carrier by the at least one second access point may be carried out in dependence on information received from the at least one second access point. The second access point may determine whether a respective carrier from a plurality of carriers is a primary listen-before-talk carrier or a secondary listen-before-talk carrier. As shown at optional step 640 of FIG. 6, the second access point may provide information to the first access point, said information comprising an indication of whether the second access point uses the respective carrier as a primary LBT carrier or a secondary LBT carrier. The information comprising an indication may be an indication as discussed with reference to the first access point.

If LAA eNB has the capability to receive and process DL transmissions from other LAA eNBs, no extra signaling from UE may be needed since the eNB can directly get information on the primary LBT carrier or secondary LBT carrier of neighbouring eNBs by receiving the indication from the neighbouring eNB.

If the information is encoded into PCID of a carrier/cell, UE does not have to signal it to the eNB separately, because PCID is present in existing RRM measurement reports.

If the information is encoded in a different way, the UE may have to report it explicitly to the LAA eNB.

Using multi-channel LBT mechanism based on primary and secondary LBT channels may simplify the design of multi-carrier LAA, as extended CCA including the exponential backoff would be done only on single carrier, namely the primary LBT carrier.

Identifying LAA primary and secondary LBT carriers from transmissions on the carriers themselves may allow for easy cross-operator detection. An operator may use the information in order to optimize its LBT operation.

Some of the embodiments may allow for primary/secondary LBT carrier identification without changing design of the used signals.

Some of the embodiments may allow for reporting the information from UEs to LAA eNB without changes to specification.

It should be understood that each block of the flowchart of FIG. 4, 5 or 6 and any combination thereof may be implemented by various means or their combinations, such as hardware, software, firmware, one or more processors and/or circuitry.

Figure 7:
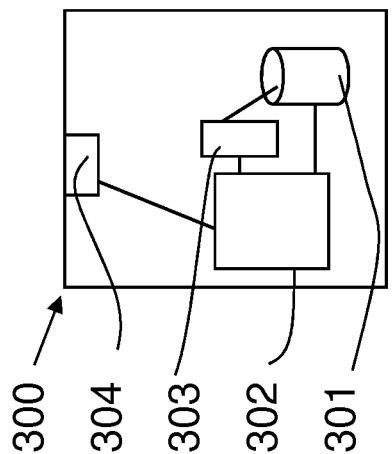
FIG. 7 shows a schematic diagram of an example control apparatus.

Embodiments described above by means of FIGS. 1 to 6 may be implemented on a control apparatus as shown in FIG. 7 or on a mobile device such as that of FIG. 2. FIG. 7 shows an example of a control apparatus for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may include determining, at a first access point, whether a carrier from a plurality of carriers is a primary listen-before-talk carrier or a secondary listen-before-talk carrier and providing information using the carrier, said information comprising an indication of whether the respective carrier is a primary listen-before-talk carrier or a secondary listen-before-talk carrier.

Alternatively, or in addition, control functions may include receiving information from a first access point using a first carrier at a second access point, said information comprising an indication of whether the respective carrier is a primary listen-before-talk carrier or a secondary listen-before-talk carrier.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE, similar principles can be applied to any other communication system or radio access technology, such as 5G. In addition, although embodiments have been described from an LAA viewpoint, this disclosure may be equally valid for other co-existence scenarios. For example, Licensed Shared Access (LSA) is an example of a co-existence scenario. LSA is a spectrum sharing concept enabling access to spectrum that is identified for IMT but not cleared for IMT deployment. LSA may be focused on bands subject to harmonization and standardized by 3GPP (2.3 GHz in EU & China, 1.7 GHz and 3550-3650 MHz in US). Co-primary sharing is another example of a co-existence scenario. Co-primary sharing refers to spectrum sharing where several primary users (operators) share the spectrum dynamically or semi-statically. Co-primary sharing may be suitable e.g. for small cells at 3.5 GHz. Spectrum sharing between operators may happen if regulators require it and/or operators need it. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 6 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 6 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory including a computer program code, the at least one memory and the computer program code configured to, with the at least one processor, cause the apparatus at least to:
   determine, at a first access point, a type of a carrier from a plurality of carriers, the type of the carrier is a primary listen-before-talk carrier or a secondary listen-before-talk carrier, wherein the primary listen-before-talk carrier differs from the secondary listen-before-talk carrier in that carrier sense multiple access with collision avoidance with exponential back-off is configured to occur only on the primary listen-before-talk carrier but not on the secondary listen-before-talk carrier, and energy detect clear channel assessment is configured to occur on the secondary listen-before-talk carrier after the primary listen-before-talk carrier is detected to be idle;
   provide information using the carrier, said information comprising an indication of the type of the carrier; and
   determine whether a type of the respective carrier used by at least one second access point is a primary listen-before-talk carrier or a secondary listen-before-talk carrier for the at least one second access point.

2. The apparatus according to claim 1, wherein the at least one memory and the computer program code configured to, with the at least one processor, cause the apparatus at least to:
   receive information from a user equipment; and
   determine whether the respective carrier is used as a primary listen-before-talk carrier or a secondary listen-before-talk carrier by the at least one second access point in dependence on the information received from the user equipment.

3. The apparatus according to claim 1, wherein the at least one memory and the computer program code configured to, with the at least one processor, cause the apparatus at least to:
   receive information from the second access point; and
   determine whether the respective carrier is used as a primary listen-before-talk carrier or a secondary listen-before-talk carrier by the at least one second access point in dependence on the information received from the second access point.

4. The apparatus according to claim 1, wherein the plurality of carriers comprises a plurality of licensed assisted access carriers.

5. A method, comprising:
   receiving, at a user equipment, information from a first access point using a carrier, said information comprising an indication of a type of the carrier, the type of the carrier is a primary listen-before-talk carrier or a secondary listen-before-talk carrier; and
   providing information to a second access point, said information comprising an indication of the type of the carrier used by the first access point, the type being a primary listen-before-talk carrier or a secondary listen-before-talk carrier, wherein the primary listen-before-talk carrier differs from the secondary listen-before-talk carrier in that carrier sense multiple access with collision avoidance with exponential back-off is configured to occur only on the primary listen-before-talk carrier but not on the secondary listen-before-talk carrier, and energy detect clear channel assessment is configured to occur on the secondary listen-before-talk carrier after the primary listen-before-talk carrier is detected to be idle.

6. The method according to claim 5, wherein the carrier comprises a licensed assisted access carrier.

7. The method according to claim 5, wherein the information comprises an indication of whether the carrier is a primary listen-before-talk carrier or a secondary listen-before-talk carrier comprising physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

8. The method according to claim 5, wherein the information comprises an indication of whether the carrier is a primary listen-before-talk carrier or a secondary listen-before-talk carrier comprising at least one of time position and frequency position of reference signals within a discovery reference signal, reference signal sequence configuration within a discovery reference signal and presence or absence of a signal sequence within a discovery reference signal.

9. The method according to claim 5, wherein the information comprises an indication of whether the carrier is a primary listen-before-talk carrier or a secondary listen-before-talk carrier comprising the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

10. The method according to claim 5, wherein the information comprises an indication of whether the carrier is a primary listen-before-talk carrier or a secondary listen-before-talk carrier comprising an explicit indication.

11. The method according to claim 10, wherein the information is encoded into signaling including cyclic redundancy check.

12. An apparatus, comprising:
    at least one processor; and
    at least one memory including a computer program code, the at least one memory and the computer program code configured to, with the at least one processor, cause the apparatus at least to:
    receive, at a user equipment, information from a first access point using a carrier, said information comprising an indication of the type of the carrier, the type of the carrier is a primary listen-before-talk carrier or a secondary listen-before-talk carrier; and
    provide information to a second access point, said information comprising an indication of the type of the carrier used by the first access point, the type being a primary listen-before-talk carrier or a secondary listen-before-talk carrier, wherein the primary listen-before-talk carrier differs from the secondary listen-before-talk carrier in that carrier sense multiple access with collision avoidance with exponential back-off is configured to occur only on the primary listen-before-talk carrier but not on the secondary listen-before-talk carrier, and energy detect clear channel assessment is configured to occur on the secondary listen-before-talk carrier after the primary listen-before-talk carrier is detected to be idle.

13. The apparatus according to claim 12, wherein the carrier comprises a licensed assisted access carrier.

14. The apparatus according to claim 12, wherein the information comprises an indication of whether the carrier is a primary listen-before-talk carrier or a secondary listen-before-talk carrier comprising physical cell identity information, wherein at least one first physical cell identity group comprising a plurality of physical cell identities is associated with primary listen-before-talk carriers, and at least one second physical cell identity group comprising a plurality of physical cell identities is associated with secondary listen-before-talk carriers.

15. The apparatus according to claim 12, wherein the information comprises an indication of whether the carrier is a primary listen-before-talk carrier or a secondary listen-before-talk carrier comprising at least one of time position and frequency position of reference signals within a discovery reference signal, reference signal sequence configuration within a discovery reference signal and presence or absence of a signal sequence within a discovery reference signal.

16. The apparatus according to claim 12, wherein the information comprises an indication of whether the carrier is a primary listen-before-talk carrier or a secondary listen-before-talk carrier comprising the relative position of a discovery reference signal within a discovery signals measurement timing configuration period, wherein a first plurality of discovery reference signal positions are associated with primary listen-before-talk carriers and a second plurality of discovery reference signal positions are associated with secondary listen-before-talk carriers.

17. The apparatus according to claim 12, wherein the information comprises an indication of whether the carrier is a primary listen-before-talk carrier or a secondary listen-before-talk carrier comprising an explicit indication.

18. The apparatus according to claim 17, wherein the information is encoded into signaling including cyclic redundancy check.

* * * * *